United States Patent [19]

Cason

[11] Patent Number: 5,469,906
[45] Date of Patent: Nov. 28, 1995

[54] SCREEN FOR REAR WINDOWS OF VEHICLES

[76] Inventor: Thomas C. Cason, 74 Fourth St., Lowell, Mass. 01850

[21] Appl. No.: 170,066

[22] Filed: Dec. 20, 1993

[51] Int. Cl.[6] ............................................. E06B 3/32
[52] U.S. Cl. ............................................. 160/105; 160/376
[58] Field of Search ............................. 160/90, 105, 369, 160/370.2 R, 376; 296/146.1, 190, 201, 166

[56] References Cited

U.S. PATENT DOCUMENTS

| | | | |
|---|---|---|---|
| 690,662 | 1/1902 | Perrin | 160/105 X |
| 1,427,620 | 8/1922 | Mushall | 160/376 |
| 1,798,187 | 3/1931 | Brouillette | 160/376 |
| 1,863,428 | 6/1932 | Westrick | 160/105 |
| 2,568,800 | 9/1951 | Galla | 160/105 |
| 2,625,217 | 1/1953 | Spiller et al. | 160/90 |
| 3,753,458 | 8/1973 | Lazarek | 160/354 |
| 4,124,054 | 11/1978 | Spretnjak | 160/90 |
| 4,249,589 | 2/1981 | Loeb | 160/368.1 |
| 4,799,422 | 1/1989 | Birt | 160/370.2 R X |
| 4,936,368 | 6/1990 | Philbeck et al. | 160/90 |
| 5,192,112 | 3/1993 | Gheradi et al. | 160/90 X |

FOREIGN PATENT DOCUMENTS 242303  12/1962  Australia ........................ 160/105

*Primary Examiner*—David M. Purol
*Attorney, Agent, or Firm*—Pearson & Pearson

[57] ABSTRACT

A rear window assembly for a vehicle comprising a generally rectangular frame having horizontal and vertical sides and being adapted to fit into a rear window opening in the vehicle. Upper and lower channels are disposed in each of the horizontal sides and are adapted to receive at least one closure member. The closure member is adapted to close a portion of the area defined by the frame. A screen having a support disposed around its perimeter is arranged to fit within the frame. The frame is detachably disposed relative to the closure member to fill the area defined by the frame whereby said screen can be readily removed from the frame.

12 Claims, 4 Drawing Sheets

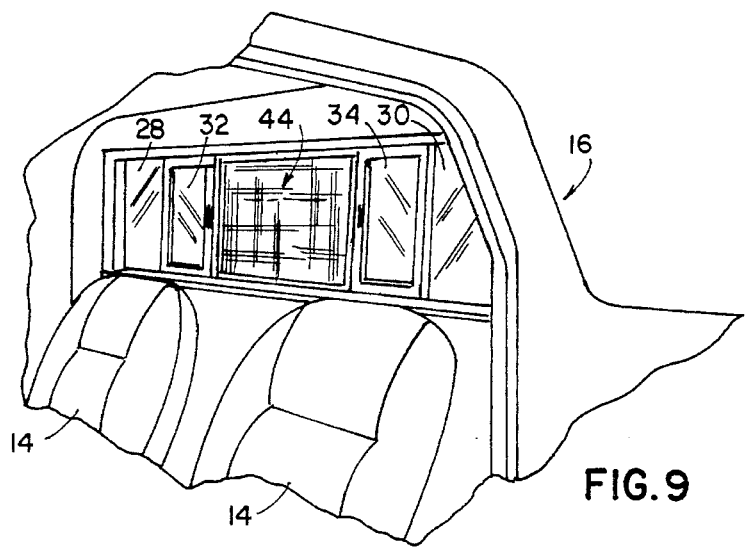
FIG.9
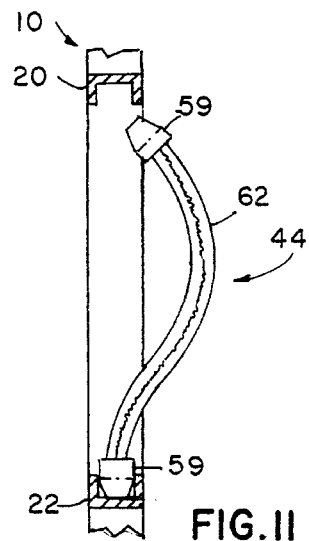
FIG.10
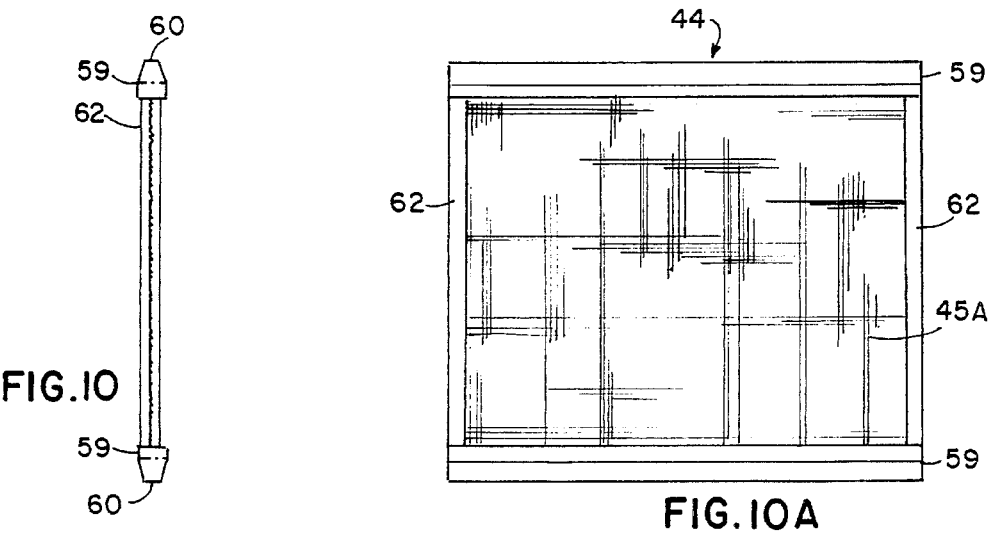
FIG.10A
FIG.11

SCREEN FOR REAR WINDOWS OF VEHICLES

BACKGROUND OF THE INVENTION

1. Field of the Invention

The present invention relates to window screens and more particularly a window screen device that can be adjusted to be installed and removed when desired to the opened area of an existing openable vehicle rear window especially some current pick-up trucks that include cabs that are equipped with openable rear windows. Commonly such rear windows of cabs comprise two moveable window panes to define a central window opening.

2. Description of Prior Art

There are numerous devices in the prior art for window screens for motor vehicle windows.

In U.S. Pat. No. 4,936,368 there is disclosed an add-on window screen installable on the rear window of a pick-up truck to prevent flying insects and debris from entering the cab area of the truck through the rear window. The screen frame is engageable with pre-existing sealing strips on the window system, such that the screen is firmly located within the window opening without screws or other attachment devices. The window system does not have to be modified in any way in order to mount the add-on screen in the window opening.

U.S. Pat. No. 3,422,876 discloses a vehicle window screen. As disclosed it is a removable screen assembly for mounting in an automobile window opening and including slidably engaged frame portions to permit a utilization of the screen assembly in automobile window openings of varying widths. The lateral edge of at least one of the frame portions is provided with a co-extending laterally projecting resilient seal member, of truncated triangular configuration, which is engageable with the body of the automobile adjacent the window opening in overlying sealing relation to the exterior surface of the automobile adjacent the window opening whereby the seal member compensates for window openings having a non-vertically disposed rear edge portion.

U.S. Pat. 4,799,422 discloses a motor vehicle window ventilator. As disclosed a motor vehicle window ventilator is provided which has a frame having a raised central portion to fit into at least a part of the encasement of the motor vehicle window, a fitting member attached to the frame by a resilient member, the fitting member being mateably insertable into at least a part of the encasement of the motor vehicle window. The bottom portion of the frame includes an indentation for receiving an edge of the motor vehicle window. An optional locking device can be attached to the frame and includes an elongated member which extends to and is connectable to the locking device of the motor vehicle.

The foregoing patents as well as the following U.S. patents are believed to exemplify the present state of the art with respect to such window screen devices for motor vehicles:

U.S. Pat. No. 4,285,383

U.S. Pat. No. 4,139,233

U.S. Pat. No. 2,598,770

While such prior art devices provide improvements in the areas intended, there still exists a need for a screen device for rear windows of motor vehicles especially for rear windows of pick-up trucks which have cabs that are equipped with windows which can be opened and closed depending on the driver's decision.

Having a screen in the rear window is especially important in that when a pickup truck is moving and when the rear window is open, air can circulate between the truck cab and the cargo area directly behind the window and can cause debris and dirt to be carried from the cargo area through the open rear window into the cab.

Accordingly a principal desirable object of the present invention is to provide a window screen which can be placed within, on and over the open area provided by the movable window panes of the vehicle cab rear window to permit air circulation into or out of the cab while preventing cargo debris from moving the window opening.

Another desirable object of the present invention is to provide a window screen which can be placed within, on and over the open area of the movable window panes of the cab rear windows and which can be easily removed when it is desired to close the window opening.

Another desirable object of the present invention is to provide a window screen device for a vehicle cab rear window which prevents debris from entering the cab and also modifies the air circulation so that dust is not readily dragged into the cab.

These and other desirable objects of the invention will in part appear hereinafter and will in part become apparent after consideration of the specification with reference to the accompanying drawings and the claims.

SUMMARY OF THE INVENTION

In accordance with the present invention there is provided a new and improved screen assembly for a rear window of a vehicle and more particularly for the rear window of a cab vehicle. The screen assembly includes a generally rectangular frame with horizontal and vertical sides that are adapted to fit into a rear window opening in the vehicle. Upper and lower channels are disposed in each of the horizontal sides and the channels are adapted to receive at least one closure member. The closure member is adapted to fixedly close a portion of the area defined by the frame. A screen with a support disposed about its perimeter is arranged to fit within the frame and in another embodiment with means attached about the outer and/or inner portions of the frame. In a preferred embodiment the screen assembly device includes a generally rectangular frame having horizontal and vertical sides. The frame has upper and lower channels disposed in each of the horizontal sides and the channels are adapted to receive at least one closure member. The screen has a support disposed around its perimeter. The support is disposed in the channels. A resilient member is disposed on either the top or the bottom of the support, or both, and is arranged to enable a user to insert the screen within a conventional open window frame and to remove it from the frame. Preferably there are two sets of upper and lower channels disposed in each of the horizontal sides and the channels are adapted to receive the closure members. One of the sets of channels is disposed on the interior side of the frame and another is disposed on the exterior side. A screen having the support around its perimeter is disposed in the set of channels on the exterior side of the frame. The resilient member, a spring for example, is disposed on either the top or the bottom of the support or both. The resilient member enables the user to insert the screen within the channel and to remove it from the frame when desired.

In one embodiment the screen device is constructed so that it is flexible to be easily inserted into the rear window assembly.

In an alternate embodiment a rear window assembly device for a vehicle is provided which includes a window pane device which is disposed in a window device and is slidably movable to enable opening or closure over a screen device attached to the rear window assembly device.

BRIEF DESCRIPTION OF THE DRAWINGS

For a fuller understanding of the nature and desired objects of the present invention, reference should be made to the following detailed description taken in conjunction with the accompanying drawings wherein like reference characters denote corresponding parts throughout several views and is wherein:

FIG. 2 s a cross-sectional view taken along the line 2A—2A of FIG. 2;

FIG. 9 is a fragmentary perspective inner view of a rear window of a conventional cab vehicle, as shown in FIG. 1, with the screen device inserted as shown in FIG. 7.

FIGS. 10 and 10A are respectively a side end view and exterior view showing a flexible screen device of the invention;

FIG. 11 is a fragmentary perspective view illustrating the attachment of the flexible screen device to the open area of a rear window of a car vehicle;

DETAILED DESCRIPTION OF PREFERRED EMBODIMENTS

Figure 1:
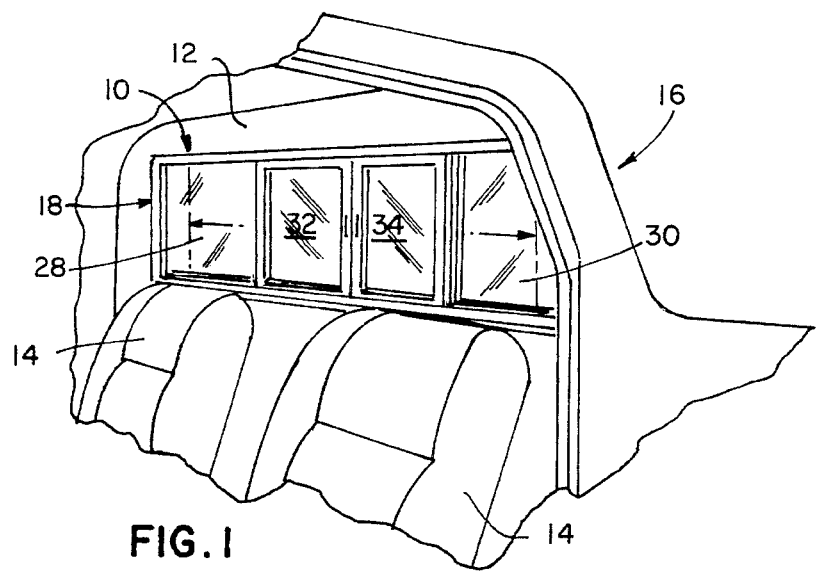
FIG. 1 is a fragmentary perspective inner view of the rear window of a conventional cab vehicle.
Figure 2:
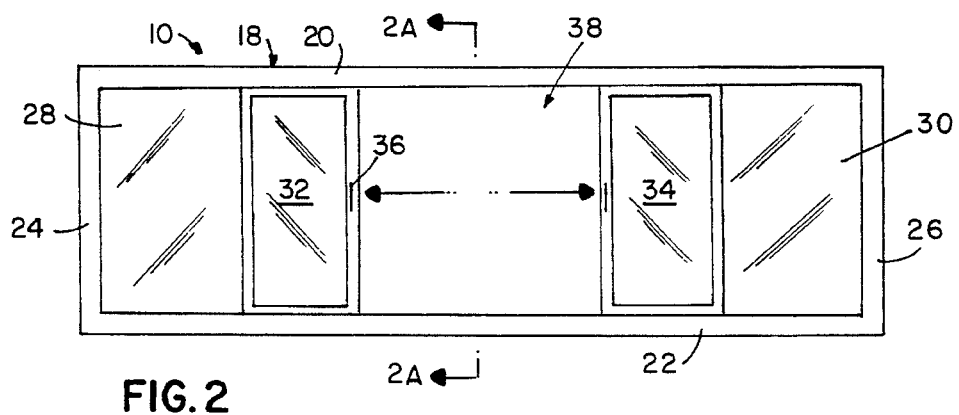
FIG. 2 an enlarged view showing the rear window of FIG. 1 with the two movable window panes in their open position.
Figure 2A:
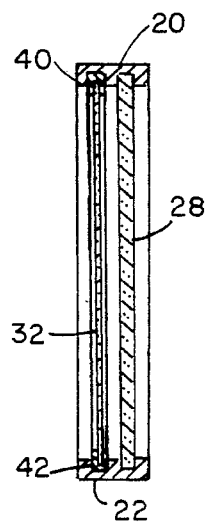

Referring now to the drawings and more particularly to FIGS. 1–2A, there is illustrated a conventional rear window device 10 which is attached to the rear wall 12 behind the seats 14 of the cab truck 16. The window device 10 has a conventional molding encasement 18 which includes an upper member 20, a bottom member 22 and side members 24 and 26. The encasement 18 includes two fixed end window panes 28 and 30 and two inner moveable window panes 32 and 34. As illustrated in FIG. 2 the window panes 32 and 34 have been moved open to the left and right by the hand gripping means 36 to provide an open area 38. As illustrated in FIG. 2A the upper member 20 and the bottom member 22 are provided with groove track channels 40 and 42 through and along which the window panes 32 and 34 are moveable back and forth.

Figure 3:
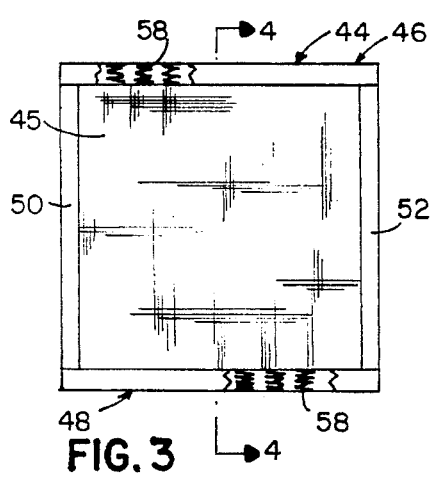
FIG. 3 is a side plan view of the window screen device partially in cross-section illustrating the flexible upper and lower devices.
Figure 5:
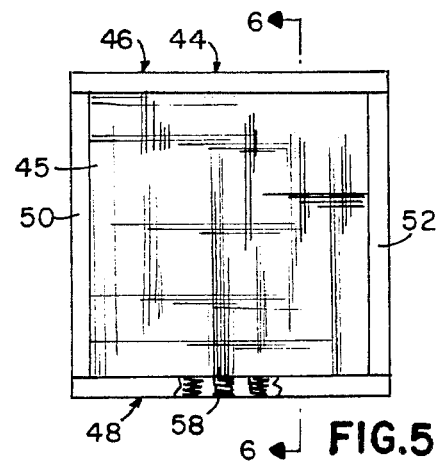
FIG. 5 is a side plan view of an alternate embodiment of the window screen device partially in cross-section illustrating the flexible lower device.
Figure 4:
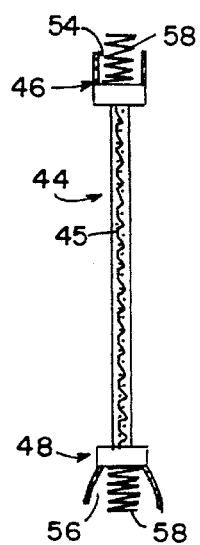
FIG. 4 is a cross-sectional view taken along the line 4—4 of FIG. 3.
Figure 6:
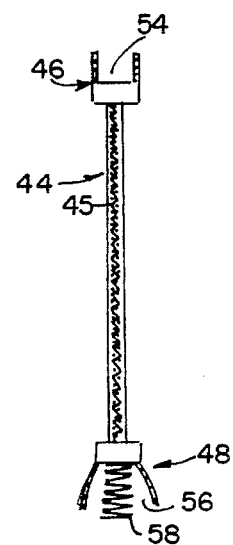
FIG. 6 is a cross-sectional view taken along the line 6—6 of FIG. 5.

Referring now to FIGS. 3 and 4, there is illustrated one embodiment of the screen device 44 of the present invention. The screen assembly 44 includes a generally rectangular frame 45 with horizontal sides 46 and 48 and vertical sides 50 and 52. The horizontal sides 46 and 48 have resilient sections 54 and 56 which can include spring devices 58 which are attached within the resilient sections 54 and 56 to hold the screen 44 in place. As illustrated in FIGS. 5 and 6 the alternate embodiment of the screen device 44 has a spring device 58 in only one horizontal side 46 or 48 such as the bottom section 48 to hold the screen 44 in place.

Figure 8:
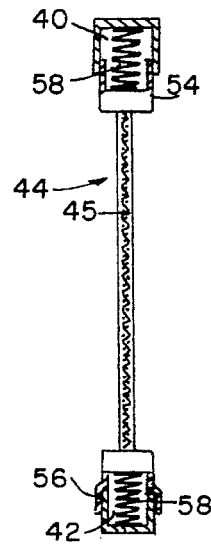
FIG. 8 is a cross-sectional view taken along the line 8—8 of FIG. 7
Figure 7:
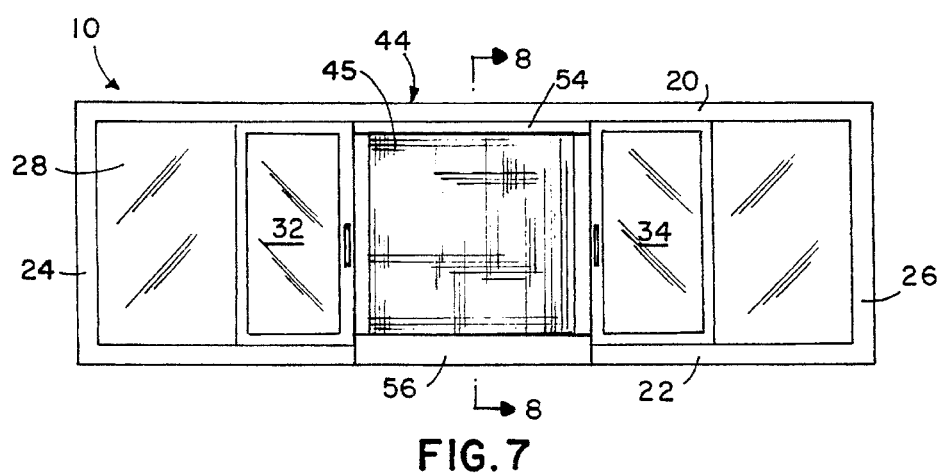
FIG. 7 illustrates the attachment of the screen device of the type illustrated in FIG. 3 attached to the open area of the rear window of the car vehicle of FIG. 2.

Referring now more particularly to FIGS. 7–9, there is illustrated one embodiment of the screen device 44. In this embodiment the top resilient section 54 is inserted within the groove track 40 and the bottom resilient section 56 is inserted over the bottom member 22.

Thus in the embodiment shown in FIGS. 3 through 8, the rear window has spaced horizontal counterfacing channels 20 and 22 for holding a horizontally displaceable closure, such as windows 32 and 34, therebetween such that the closure is displaceable between open and closed positions. The screen assembly shown in FIGS. 3 through 8 fills the spaced vacated when the window is open and includes an open frame 46 with horizontal side structures 46 and 48 that engage the channels 20 and 22. A screen 45 attaches to the open frame 46. One or both of the horizontal sides 46 and 48 include a resilient structure in the form of springs 58 that extend in the plane of the screen, as shown in FIGS. 4, 6 and 8 from the edge of the open frame. The screen effectively changes the separation of the horizontal sides between a normally extended condition as when the springs are free to expand and a compressed condition. When installed as shown in FIG. 8 the horizontal sides including the springs 58 expand into the channels thereby to support the screen assembly between the channels. When the springs are compressed, as by displacing the frame, they enable removal of the spring assembly from the window.

Referring now to FIGS. 10 and 10A, there is illustrated an alternate embodiment of the screen device 44 of the present invention with flexible frame 45A with horizontal sides 59 with reduced outer ends 60 and flexible vertical sides 62. As illustrated in FIG. 11, the screen device 44 can be easily bent to insert it into the upper member 20 and the bottom member 22 of window devices such as window device 10 as illustrated in FIGS. 2, 7 and 8.

Thus the embodiment shown in FIGS. 10, 10A and 11 constitutes a screen assembly with an open frame 44 including horizontal sides 59 and vertical sides 62. The vertical sides 62 lie in the plane of the screen assembly as shown in FIGS. 10 and 10A and are rigid in that plane, but, as shown in FIG. 11, are flexible normally to that plane. In a flexible or bent position, the vertical sides 62 enable the screen to assume a compressed state. Internal stresses extend the structure back toward the form shown in FIG. 10 to an expanded state. In the expanded state the vertical sides 62 extend the horizontal sides toward the top and bottom horizontal channels. In this particular embodiment the horizontal sides 59 carry outer tapered members that constitute an edge for engaging the counterfacing channels 20.

Figure 12:
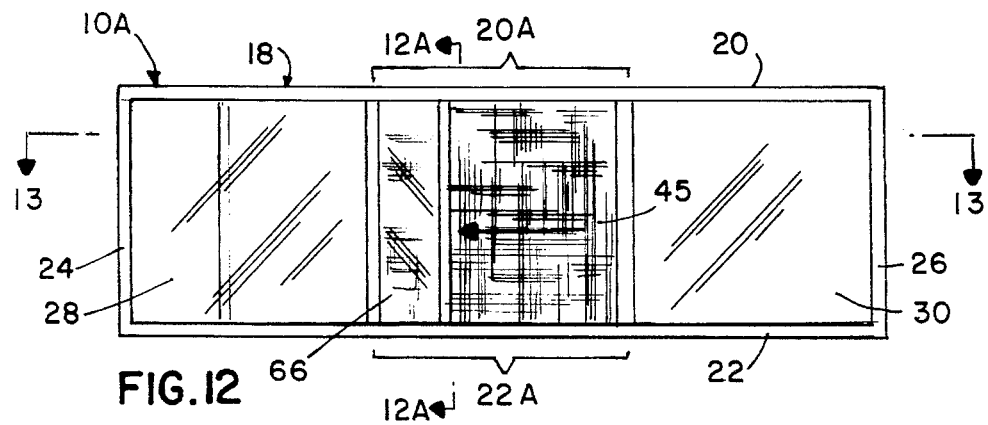
FIG. 12 is a front elevational view of a rear window assembly device according to the present invention for a conventional cab vehicle.
Figure 12A:
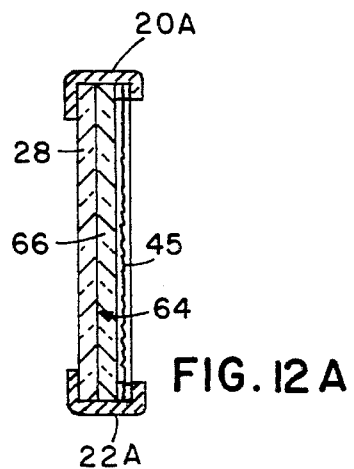
FIG. 12A is a cross-sectional view taken along the line 12A—12A of FIG. 12.
Figure 13:
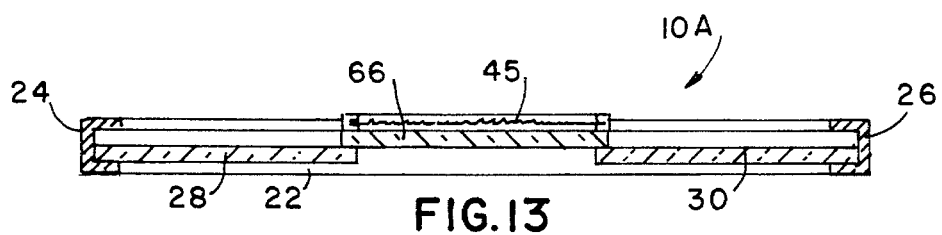
FIG. 13 is a cross-sectional view taken along the line 13—13 of FIG. 12.
Figure 13A:
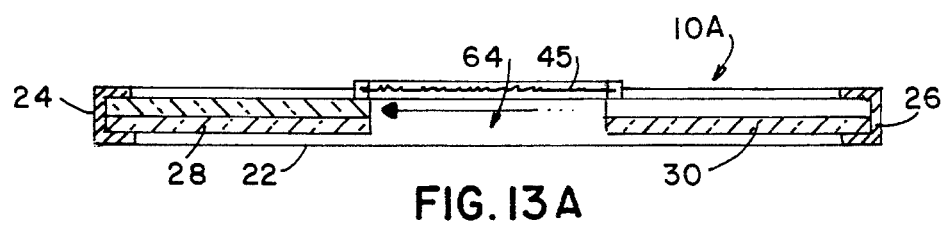
FIG. 13A is the cross-sectional view of FIG. 13 illustrating the opening of the center window device.

Referring now to FIGS. 12–13A, there is illustrated an alternate embodiment of a rear window assembly device 10A for a vehicle which includes a molding encasement 18 which includes an upper member 20, a bottom member 22 and side members 24 and 26. The molding encasement 18 includes two fixed end window panes 28 and 30. The upper and lower center portions 20A and 22A extend rearward to secure the frame 45 and provide an open area 64 for the movable window pane 66. As illustrated in FIGS. 12–13A and particularly FIGS. 13 and 13A this embodiment of the rear window assembly device of the present invention provides a window device 66 which can be moved to provide an opening with a screen device covering the opening.

Additionally the screen frame device can be attached to a rear window device 10 with conventional hook and loop fasteners.

While the invention has been described with respect to preferred embodiments, it will be apparent to those skilled in the art that changes and modifications may be made without departing from the scope of the invention herein involved in its broader aspects. Accordingly, it is intended that all matter contained in the above description, or shown in the accompanying drawing shall be interpreted as illustrative and not in limiting sense.

What is claimed is:

1. In a rear window assembly for a vehicle, said rear window assembly having spaced, horizontal, counterfacing channels for holding a horizontally displaceable closure therebetween such that the closure is displaceable between open and closed positions, the improvement of a screen assembly for filling the space vacated when the closure is displaced to an open position, said screen assembly comprising an open frame with horizontal side means for engaging the channels and a screen attached to said open frame, one of said horizontal side means including resilient means for changing the effective separation of said horizontal side means between a normally extended condition and a compressed condition, said horizontal side means seating in the channels in the extended condition thereby to support said screen assembly between said channels, said horizontal side means in the compressed condition enabling the removal of said screen assembly from the window assembly.

2. A screen assembly as recited in claim 1 wherein said resilient means comprises spring means attached to one of said horizontal side means whereby said spring means contacts an adjacent channel thereby to seat the corresponding side means.

3. A screen assembly as recited in claim 1 wherein said resilient means comprises spring means attached to each of said horizontal side means whereby said spring means contacts an adjacent channel thereby to seat the corresponding side means in the adjacent channel.

4. A screen assembly as recited in claim 1 additionally comprising first and second spaced vertical members that establish the spacing between said horizontal side means said vertical members, each of said vertical members normally lying in a plane and being rigid in the plane and being displaceable normally to the plane.

5. A method as recited in claim 4 wherein each of said horizontal side members includes a compressible edge for engaging the counterfacing channels.

6. A rear window assembly for a vehicle comprising:
   A. spaced, horizontal, counterfacing channels for holding a horizontally displaceable window therebetween such that the window is displaceable between open and closed positions,
   B. a screen assembly for filling the space vacated when the window is open, said screen assembly including:
      i. an open frame with horizontal side means for engaging the channels, and
      ii. a screen attached to said open frame, one of said horizontal side means including resilient means for changing the effective separation of said horizontal side means between a normally extended condition and a compressed condition, said horizontal side means seating in the channels in the extended condition thereby to support said screen assembly between said channels, said horizontal side means in the compressed condition enabling the removal of said screen assembly from the window assembly.

7. A window assembly as recited in claim 6 wherein said resilient means comprises spring means attached to one of said horizontal side means whereby said spring means contacts an adjacent channel thereby to seat the corresponding side means.

8. A window assembly as recited in claim 7 said screen assembly lies in a plane and said spring means comprises a plurality of springs attached to the edge of said horizontal side means thereby to extend in the plane of said screen assembly and to contact an adjacent channel thereby to seat the corresponding side means.

9. A screen assembly as recited in claim 6 wherein comprises spring means attached to each of said horizontal side means whereby said spring means contact an adjacent channel thereby to seat the corresponding side means in the adjacent channel.

10. A window assembly as recited in claim 9 said screen assembly lies in a plane and each of said spring means comprises a plurality of springs attached to the edge of said horizontal side means thereby to extend in the plane of said screen assembly and to contact an adjacent channel thereby to seat the corresponding side means.

11. A screen assembly as recited in claim 6 additionally comprising first and second spaced vertical members that establish the spacing between said horizontal side means said vertical members, each of said vertical members normally lying in a plane and being rigid in the plane and being displaceable normally to the plane.

12. A method as recited in claim 11 wherein each of said horizontal side members includes a tapered edge for engaging the counterfacing channels.

\* \* \* \* \*